United States Patent [19]

Näslund

[11] 4,455,880
[45] Jun. 26, 1984

[54] ELECTRONIC TRANSMITTER ELEMENT AND A LIFTING DEVICE COMPRISING SUCH ELEMENT

[75] Inventor: Leif Näslund, Karlstad, Sweden

[73] Assignee: Handelsbolaget Örnell-Teknik, Sweden

[21] Appl. No.: 360,919

[22] Filed: Mar. 23, 1982

[51] Int. Cl.³ ............................................... G01L 5/00
[52] U.S. Cl. .............................. 73/862.56; 73/862.65; 177/147
[58] Field of Search ........... 73/862.39, 862.48, 862.52, 73/862.56, 862.62, 862.65; 177/147; 254/273

[56] References Cited

U.S. PATENT DOCUMENTS

| | | | |
|---|---|---|---|
| 3,289,473 | 12/1966 | Louda | 73/862.56 X |
| 3,290,931 | 12/1966 | Fowkes et al. | 177/147 X |
| 4,140,010 | 2/1979 | Kulpmann et al. | 177/147 X |

OTHER PUBLICATIONS

Fofanov-"Electrical Traction Dynamometers", Meas. Techniques (Oct. 74) vol. 17, No. 10, pp. 1530-1532, Pub. 3/1975.

*Primary Examiner*—Charles A. Ruehl
*Attorney, Agent, or Firm*—Burns, Doane, Swecker & Mathis

[57] ABSTRACT

An electronic transmitter element intended for use in connection with a lifting device in order to generate an electric signal corresponding to the load being handled. The transmitter element comprises a tensile link (1) to which strain gauges are fixedly attached, said tensile link being exerted to tensile stress corresponding to the load handled by the lifting device in order to generate an electric signal corresponding to said load. At least one safety link (3) is disposed in parallel with the tensile link, preferably two safety links on each side of the tensile link and is designed to absorb greater loads than the tensile link. In normal operation the tensile link will absorb the entire load acting on the transmitter element. However, the safety link will take over at least a portion of the load acting on the tensile link if the latter is ruptured or abnormally elongated. The transmitter element can be used in a lifting device with a stationary pulley wheel to support one end of the pulley axle, whereas the opposite end is pivotally supported in the frame of the lifting device.

2 Claims, 7 Drawing Figures

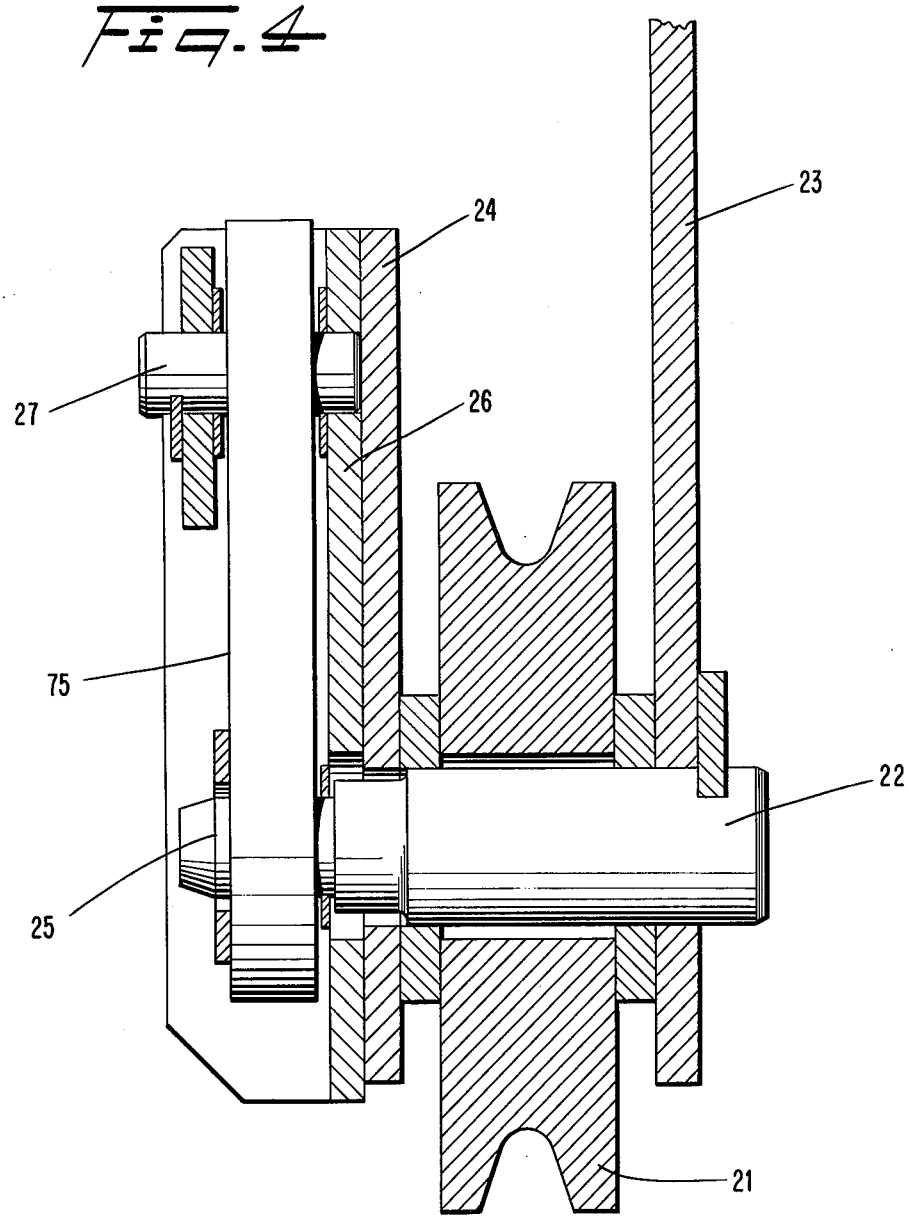

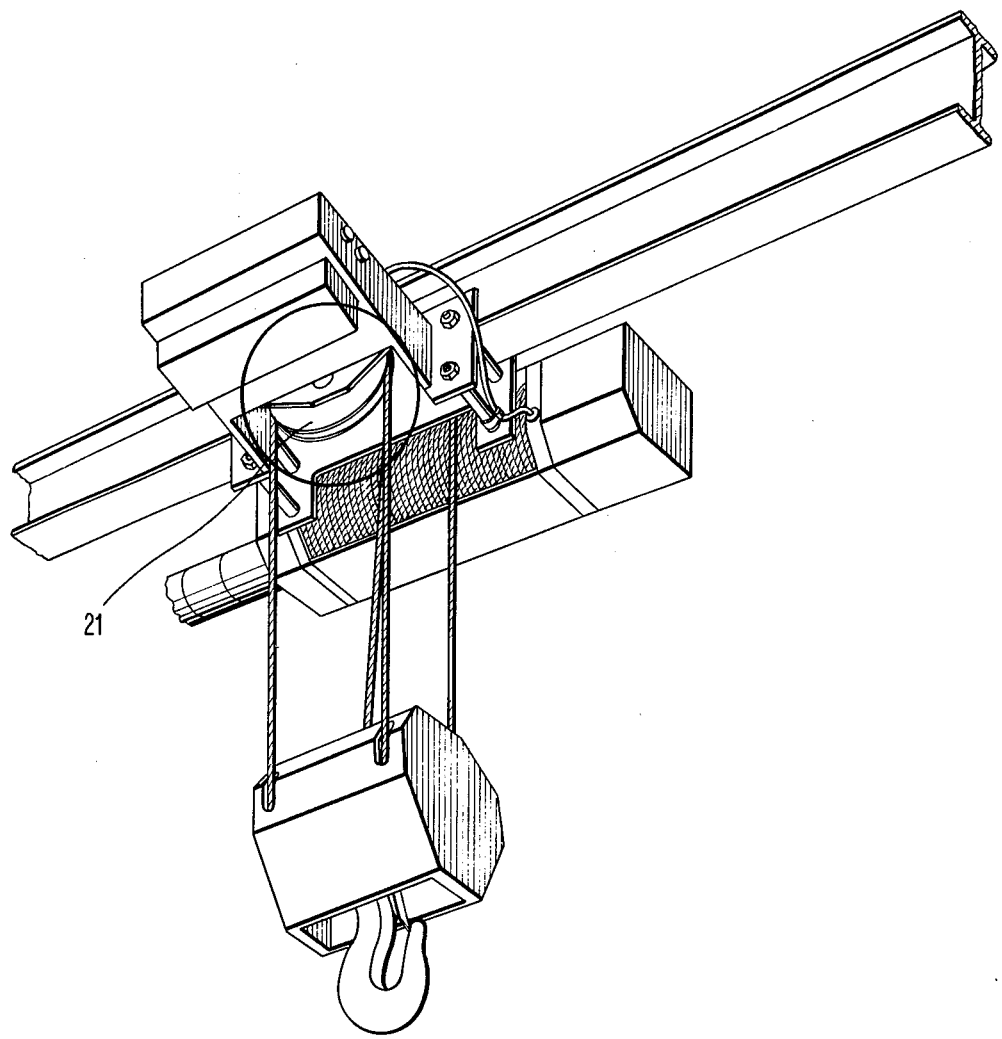
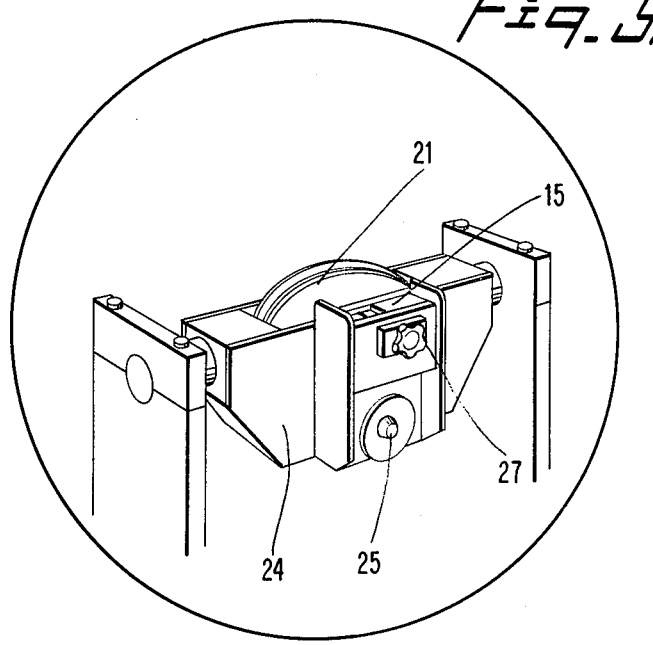

ELECTRONIC TRANSMITTER ELEMENT AND A LIFTING DEVICE COMPRISING SUCH ELEMENT

BACKGROUND AND SUMMARY OF THE PRESENT INVENTION

The present invention relates to an electronic transmitter element which is to be used in a lifting device in order to generate an electrical signal corresponding to the load handled by the lifting device. The transmitter element is provided with strain gauges and is subjected to a tensile strain corresponding to the load. The element according to the invention can either form an integral part of an electronic weighing system or serve as a pure overload protective device, breaking the energy supply to the lifting device when the maximum permitted overload is exceeded.

Transmitter elements of the kind mentioned above are previously known and used in connection with different types of lifting devices such as telfers, cranes, travelling cranes and similar lifting devices. Such arrangements are known for example from SE-A Nos. 7310533-0 and 7502923-1, FR-A No. 2 234 557 and U.S. Pat. No. 3,827,514. There are also transmitting elements intended for weighing purposes or as protection against overload comprising a link-shaped element which is to be used as a splice element in a wire or cable or to support a pulley wheel which is subjected to tensile stresses corresponding to the actual load. These transmitter links must be designed to withstand tensile stresses with good margin relative to the maximum permitted load to be handled by the lifting device. It is common to operate with safety factors in the region of three or four. This means of course that the deformation of the material arising through tensile stresses in the links will be insignificant and utterly uncertain, specifically when the actual load handled by the lifting device is relatively light and in the lower range of the capacity of said device. If the tensile link is to be used as an overload protective device the situation referred to above will of course not have any greater influence but if the link is intended to form an integral part of a weighing system it will naturally mean a considerable drawback. The load detecting elements described in the abovementioned Swedish specifications are in themselves simple strain gauges which are easy to integrate in a lifitng device where wires or cables are used for the lifing operation. Such a cable load gauge is also described in U.S. Pat. No. 2,795,136, comprising two cable bearing members in the shape of rollers or pads at opposite ends of the device and a central portion with a tightening device which deforms or bends the cable intermediate the pads or rollers, said tightening device including a link which is subjected to tensile stresses when the cable is subjected to load. These kinds of previously known transmitter elements cannot, however, be used in applications other than pure overload protective equipment and/or for weighing purposes where there is no need for high accuracy.

The object of the element according to the present invention is to accomplish a structure which is both simple and cheap in manufacture and easy to install on site in travelling cranes and other types of lifting devices and simultaneously permits weighing with good accuracy.

This object is realized with a transmitter element substantially characterized in that at least one safety element is arranged in parallel with the tensile link and is designed to withstand higher load than a tensile link, and that said tensile link in normal operation is arranged to absorb the entire load acting on the transmitter element, whereas the safety element in case of rupture or abnormal elongations of the tensile link is arranged to take over at least a portion of the loading acting on the tensile link.

Since there is no need to design the tensile link for loads which substantially exceed the loads to be measured or handled the deformation in the material will be comparatively high and therefore will be detected with high accuracy by means of the strain gauges.

A further object of the invention is to provide a simple installation of an electronic transmitter element in a lifting device comprising at least one pulley wheel which is supported by a frame portion in which the pulley shaft is pivotally mounted in order to generate an electric signal corresponding to the load acting on the pulley shaft. This object is realized substantially by the fact that one end of the pulley shaft is pivotally supported in the frame portion, whereas its opposite end is pivotally supported in the electronic transmitter element, said element comprising a tensile link which is provided with strain gauges, one end of said link being pivotally connected to the frame portion, whereas the opposite end is supporting the pulley shaft.

BRIEF DESCRIPTION OF THE DRAWINGS

Other objects and advantages of the invention will become apparent from the following description and accompanying drawings in which like reference characters refer to like parts in the several figures of the drawings.

FIG. 4 is a cross sectional view of another embodiment of the invention in which the transmitter element supports one end of a pulley shaft;

FIG. 5 is a perspective view from below of a telfer line with a pulley shaft one end of which is supported by an arrangement according to FIG. 4; and FIG. 5A is an enlarged detail view of the portion of FIG. 5 indicated by a circle.

DETAILED DESCRIPTION OF THE PREFERRED EMBODIMENT

Figure 1:
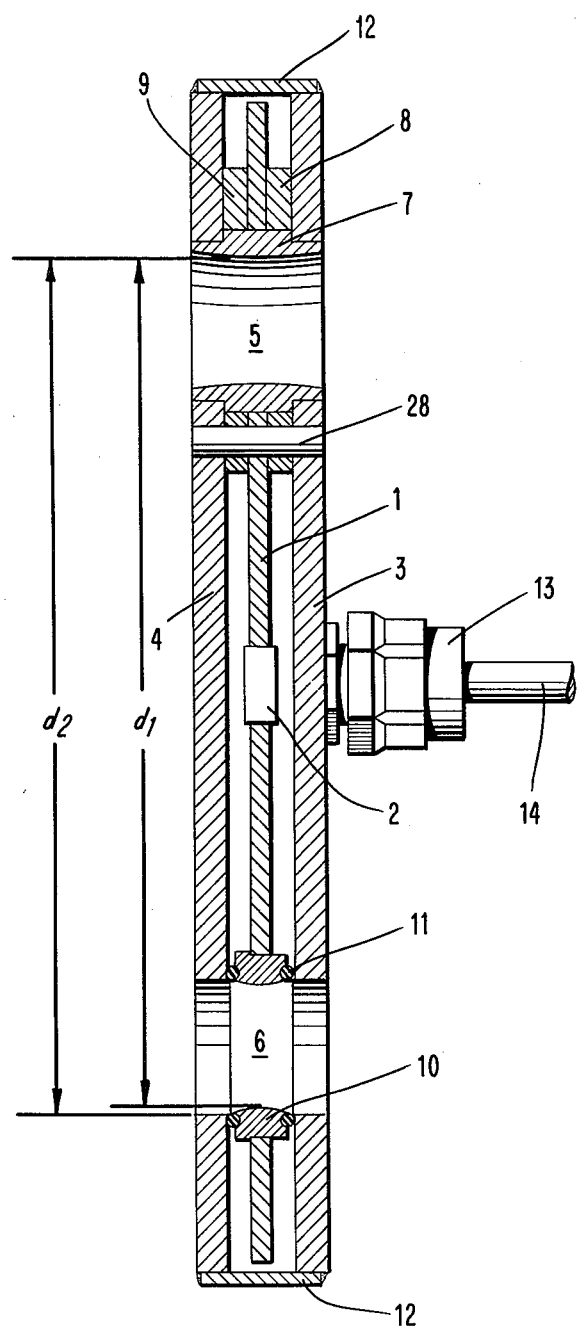
FIG. 1 is a cross sectional view through a transmitter element according to the invention.
Figure 2:
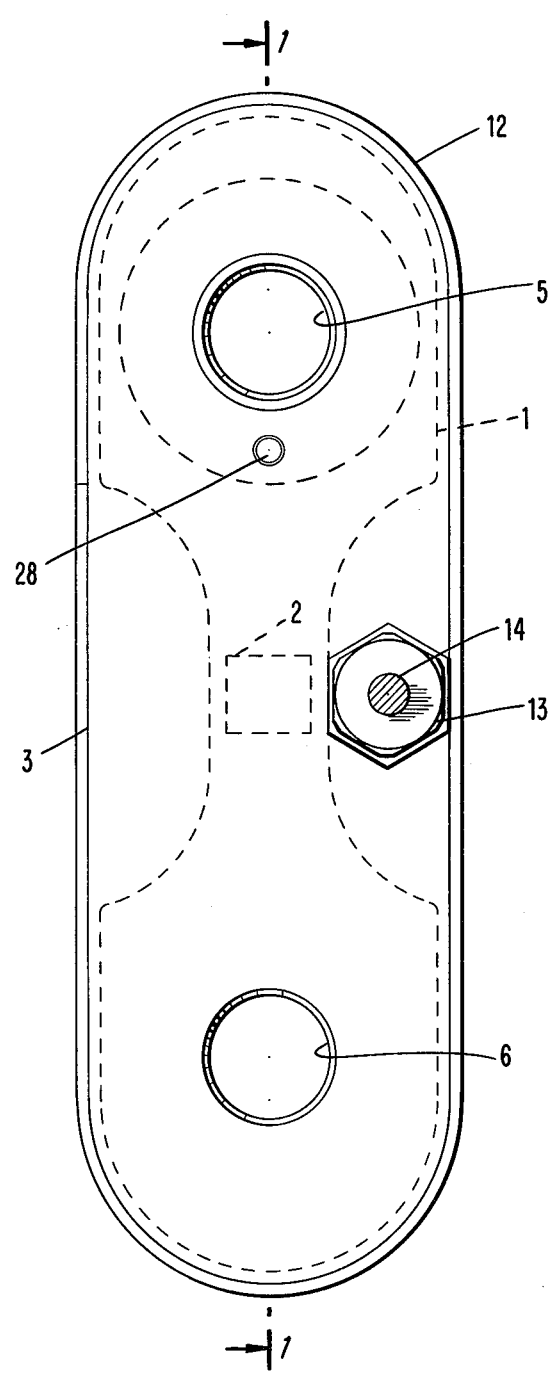
FIG. 2 is a lateral view of the transmitter element according to FIG. 1

The transmitter element according to FIGS. 1 and 2 comprises a tensile link to which strain gauges 2 have been attached to generate an electric signal corresponding to the tensile stress to which the link is subjected. Two security links 3 and 4 are located on each side of the tensile link 1 and all links are provided with bores at their ends, said bores being disposed right opposite one another in order to form two openings 5 and 6 in the transmitting element. The tensile link 1 is pivotably mounted in the upper opening 5 in the two safety links by means of a sleeve 7 passing through the bores. The two safety links 3 and 4 are rigidly connected with one another by means of a plate 12 which is welded to the peripheries of the links. Spacing elements 8 and 9 are located on each side of the tensile link in order to maintain a correct position between the saftey links 3 and 4. A support ring 10 is arranged in the lower opening 6 of the bore in the tensile link and this support ring is thus shaped that the inner effective length $d_1$ of the tensile link is less than the corresponding inner effective lengths $d_2$ of the safety links. The support ring 10 is provided with seats for elastic packings 11 facing the two safety links 3 and 4 to prevent dirt and moist from penetrating into the strain gauges 2 which are glued to the tensile link 1. Since the inner effective length $d_1$ of the tensile element is less than the corresponding inner effective lengths $d_2$ of the safety links the support ring 10 will normally absorb the entire tensile load on the transmitter element 1. Due to the magnitude of the load the support ring 10 will consequently be displaced in the longitudinal direction between the two safety links and only if the tensile link is ruptured or obtains an inner effective length $d_1$ which is equal to the effective lengths $d_2$ of the safety links the latter will take over at least a portion of the load acting on the tensile link. The effective length $d_1$ of the tensile link and those of the safety links should be thus adapted to one another that the maximum permitted elongation of the tensile link is well below the yield point of the material. This means that after an instantaneous overload of the transmitter element to an amount which exceeds the tensile strength of the tensile link several times the latter can resume its normal function without having been destroyed and replaced. In this respect the transmitter element according to the invention differs from hitherto known structures where an occasional overload above the yield point of the material will entail the rejection of the entire transmitter element.

In the embodiment shown in FIG. 1 the sleeve 7 is shaped with a gradually increasing inner diameter from the center and towards the end of the sleeve. The contact surface against the shaft passing through the sleeve will consequently be spot-shaped which means that the shaft can be somewhat tilted relative to the transmitter element without any bending moments being introduced in the tensile link.

It can also be suitable to fixedly attach the tensile link 1 relative to the safety links 3 and 4 by means of a pin 28 passing through the link in order to prevent the tensile link from being rotated around the sleeve 7 and get stuck in a position where the safety link at normal load will shunt away part of the load to be measured by the tensile link.

One of the safety links 3 is provided with a bore for a bushing 13 for the electric cable 14 which is connected to the strain gauges 2. The cable 14 is in conventional manner connected to an electronic circuit, such as that shown on the citations referred to in the opening part of the description in which the signal from the transmitter is converted to a signal which either controls a relay breaking the current supply to the lifting device or to a read-out display showing the actual load handled by the device. The electronic circuit also comprises potentiometers for balancing the weighing equipment and for calibrating the overload protective device and/or the weighing device.

Figure 3:
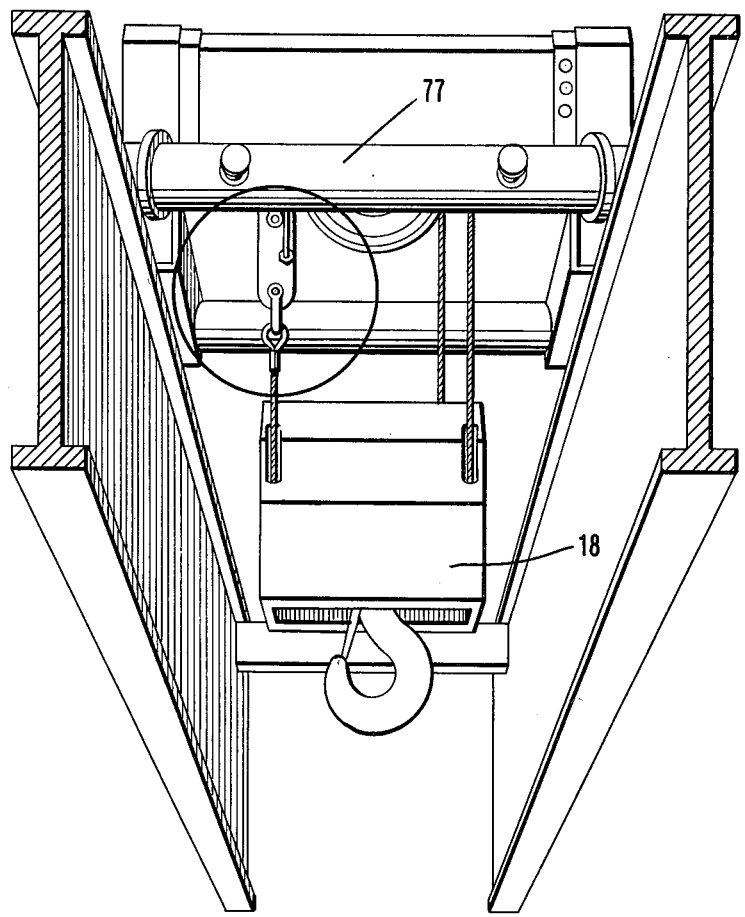
FIG. 3 is a perspective view from below of a travelling crane.
Figure 3A:
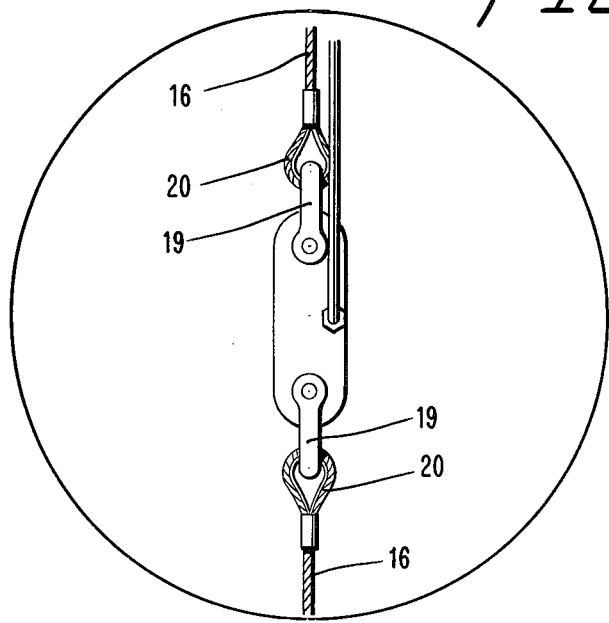
FIG. 3A is an enlarged detail view of the portion of FIG. 3 indicated by a circle of the crane arrangement showing the spliced portion with a transmitting device according to the invention.

FIG. 3 shows a specific use of the transmitter element according to the invention in a traverse crane. One end of the element 15 is consequently connected to the fixed portion of the cable 16 which is connected to the frame portion of the traverse crane, in this case a lateral beam 17, whereas the other end of the element 15 is connected to that part of the cable which is running through the hook block 18. Since the transmitter is connected to the electronic circuit through the cable 14 the element must not take part in the lifting movement. As appears from the enlarged detail of FIG. 3A the cable 16 is connected to the element 15 by means of shackles 16 which are introduced into loops 20 on the cable. In this embodiment the tensile strength in the transmitter element will consequently correspond to one fourth of the load handled by the lifting device.

FIG. 4 shows an important embodiment of a lifting device in which the transmitter element according to the invention is used to support one end 25 of an axle 22 supporting the pulley wheel 21. The opposite end of the pulley axle is pivotally supported in a frame portion 23 and that end 25 which is supported by the pulley wheel is passed with clearance through a hole in the frame portion 24 and is then received in the lower opening 6 of a transmitter element 15 according to the invention. The transmitter element is in its turn pivotally connected by means of a shaft 27 through the upper opening 5 to a supporting structure 26 which is rigidly connected to the frame stucture 24 by means of weld or bolts. Thus, half of the load acting on the pulley wheel 21 will be detected by the transmitter element 15 and it will thus be possible to measure the load handled by the crane.

FIG. 5 shows a specific appliance of the weighing structure according to FIG. 4 in a telfer line where the arrangement of the transmitter element 15 to the frame portion 24 supporting the pulley wheel 21 can be seen on the enlarged detail of FIG. 5A. This specific embodiment has certain advantages over the arrangement shown in FIG. 3 since it will not harmfully affect the lifting height of the hook block which is the case in the embodiment shown in FIG. 3. Moreover, it is much more simple to apply an overload and/or measuring device according to FIG. 4 to a crane due to the fact that the only detail which has to be replaced in the crane is the original pulley shaft, and this could be done without dismantling the wheel from the frame. The supporting structure with the transmitter element can than easily be welded to the outside of the frame. In the embodiment according to FIG. 3 the cable must be spliced and the cable ends provided with loops to be connected with the intermediate transmitter element. This is a far more complicated and time consuming operation.

The principles, preferred embodiments and mode of operation of the present invention have been described in the foregoing specification. However, the invention which is intended to be protected is not to be construed as limited to the particular embldiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A lifting device comprising at least one pulley wheel which is supported by a frame portion in which the pulley shaft is pivotally supported, an electronic transmitter element being connected to the pulley shaft in order to generate a signal corresponding to the load acting on said shaft, characterized in that one end of the pulley shaft is pivotally supported in the frame portion, whereas its opposite end is pivotally supported in the electronic transmitter element, said element comprising a tensile link which is provided with strain gauges, one end of said link being pivotally connected to the frame portion whereas the opposite end is supporting the pulley shaft.

2. A lifting device according to claim 1, characterized in that two safety links are disposed on each side of the tensile link, each of said links being provided with bores in both ends, said bores being thus located that the inner effective length of the tensile link is less than the inner effective lengths of the safety links.

* * * * *